United States Patent [19]

Rossi

[11] Patent Number: 4,660,447

[45] Date of Patent: Apr. 28, 1987

[54] WHEEL WRENCH SUPPORT

[76] Inventor: Walter G. Rossi, P.O. Box 13569, Sinoville. 0129. Pretoria. Transvaal Province, South Africa

[21] Appl. No.: 748,498

[22] Filed: Jun. 25, 1985

Related U.S. Application Data

[63] Continuation of Ser. No. 492,596, May 9, 1983, abandoned.

[30] Foreign Application Priority Data

May 10, 1982 [ZA] South Africa ................... 82/3210

[51] Int. Cl.$^4$ ..................... B25B 23/00; B66F 3/00
[52] U.S. Cl. ................................. 81/462; 254/120
[58] Field of Search ................ 81/52, 180.1, 462; 248/125, 221.2, 407; 254/108, 116, 120, 129

[56] References Cited

U.S. PATENT DOCUMENTS

| | | | |
|---|---|---|---|
| 1,833,834 | 11/1931 | Hardsocg | 248/125 X |
| 2,260,241 | 10/1941 | Bargen | 248/407 |
| 2,911,867 | 11/1959 | Ross | 81/53 R X |
| 2,960,895 | 11/1960 | Richards | 81/53 R X |
| 2,998,001 | 8/1961 | Lofgren et al. | 248/125 X |
| 3,069,945 | 12/1962 | Shandel | 81/53 R |
| 3,097,550 | 7/1963 | Johnston | 81/53 R |
| 3,262,341 | 7/1966 | Cline et al. | 81/53 R |

FOREIGN PATENT DOCUMENTS

| | | | |
|---|---|---|---|
| 0094248 | 11/1983 | European Pat. Off. | 81/53 R |
| 1536907 | 12/1978 | United Kingdom | 81/53 R |

*Primary Examiner*—Frederick R. Schmidt
*Assistant Examiner*—Maurina Rachuba
*Attorney, Agent, or Firm*—Fred Wiviott

[57] ABSTRACT

This invention provides a wheel wrench support which comprises a stand member having a suitable base and an elongate body having a plurality of step-like formations or notches along the one side of the body, and a saddle member which includes a saddle formation or seat in which part of a wheel wrench can rest, an engaging formation adapted to engage a desired notch of the stand member, and biassing means capable of urging the saddle member toward the stand member in such a manner that the engaging formation engages a notch of the stand member.

The saddle member also comprises a recess formation, preferably in the form of a passage, extending vertically through the saddle member so that the stand member passes through the passage of the saddle member.

The biassing means comprises a spring-loaded pin or ball contained substantially within the body of the saddle member on that side of the saddle member opposite to the engaging formation and relative to the recess formation or passage.

The support provides a method of applying torque to a wheel nut or stud.

12 Claims, 4 Drawing Figures 4,660,447

WHEEL WRENCH SUPPORT

CROSS REFERENCE TO RELATED APPLICATION

This is a continuation of application Ser. No. 06/492,596 filed May 9, 1983, now abandoned.

This invention relates to a wheel wrench support. More particularly, this invention relates to a support for a wheel nut wrench hereinafter referred to generally as a wheel wrench.

BACKGROUND OF THE INVENTION

The ordinary crank and X-shaped wheel wrenches, or socket spanner and tommy bar, for removing the nuts from the studs of a passenger car wheel are generally satisfactory and present few problems in use. These same wrenches, however, when used on the wheel of a truck, especially with dual wheels, present a completely different situation. Not only does the recessed position of the studs present a problem but also considerable torque is required to loosen the nuts. Because of the considerable torque required, the wrench often moves out of co-axial alignment with the stud and nut, resulting in the wrench often slipping off the nut, sometimes injuring the user and/or damaging the nut and/or the wrench being used.

The main reason for these latter problems is that the wrench is not properly supported, unless two persons perform the operation, one person holding the wrench in co-axial alignment, whilst the second person applies torque to the wrench.

In view of these problems, certain supports have been designed and exist in the prior art which attempt to overcome or assist in overcoming this problem. For example in U.S. Pat. No. 2,577,157 to Loren A. Ross a link chain is wound around the wrench. However, the cost of the link chain made the device too expensive to manufacture and sell.

In U.S. Pat. No. 2,911,867 also to Loren A. Ross, the aforementioned socket wrench turning device is simplified, and in place of the link chain, an elongated leverage casing is provided that has a transverse opening near one end, which is adapted to receive a socket wrench, and has a leverage rod at its other end that extends substantially at right angles to the length of the casing in order that the operator may apply the desired leverage in loosening or tightening sleeve-like bolts and nuts of truck wheels.

In U.S. Pat. No. 3,097,550 to H. Johnston, a jack-like device is provided that has a V-shaped cradling seat which is vertically adjustable by means of a hole and pin arrangement. However, is it well known that pin and hole arrangements, sometimes malfunction as do sleeve arrangements which are prone to stick.

U.S. Pat. No. 3,069,945 to Fred Shandel also provides a sleeve-like arrangement with a pin and hole arrangements, as well as a screw threaded and interlocking rack arrangement. As mentioned above, these devices tend to malfunction, and in respect of the screw threaded or rack arrangement, this tends to be expensive to produce.

U.S. Pat. No. 3,262,341 to J. H. Cline and J. D. Cline, a wrench support is provided which rests on the inside part of the wheel rim. The support, however, is not adjustable. This device can also not be used on all truck wheels.

In British Pat. No. 1 536,902 to F. T. Hatcher, a wrench support is provided with a stand having a plurality of vertically spaced apart holes therein to provide for vertical adjustability.

OBJECTS OF THE INVENTION

One object of the present invention is to provide a simple yet versatile wheel wrench support which is easy to manufacture and use in respect of all types of truck wheels, for example.

Another object of the present invention is to provide an improved method of fastening and loosening of wheel nuts with the aid of the wheel wrench support described herein.

SUMMARY OF THE INVENTION

This invention provides a wheel wrench support comprising a stand member capable of engaging the ground at its one end and having a plurality of steplike formation provided along its length, and a saddle member capable of being adjustably located at a desired site along the length of the stand member, the saddle member including a saddle formation adapted to receive a wheel wrench, a recess formation to operatively accomodate the stand member, and a biasing means adapted to urge an engaging formation associated with the recess formation to engage a recess between a selected pair of the step-like formations.

The stand member may include a base optionally having friction increasing means on the outer extremity of the base.

Each step-like formation may be triangular in cross-section and may have its upper part extending perpendicular to the longitudinal axis of the stand member.

The recess formation in the saddle member may be a passage extending through the saddle member.

The passage through the saddle member may be angled such that the saddle member can be relocated along the stand member by disengagement from the stand member by suitably angling the free end of the saddle member away from the ground engaging end of the stand and displacing the saddle member to a desired site along the stand member whilst the saddle member is in an angled condition.

The biasing means may be adapted to urge the saddle member from its angular condition to a condition where the free end of the saddle member returns to a location closer to the ground engaging end of the stand member.

In a preferred form of the invention, the biassing means may comprise a spring-loaded ball located essentially within the saddle member.

The engaging formation may be a surface of the recess formation, at or near its end closest the ground engaging end of the stand.

In a preferred form of the invention, there is provided a wheel wrench support comprising a stand member capable of engaging the ground at its one end and having a plurality of steplike formations provided along its length, each step-like formation being triangular in cross-section and having its lower part extending generally perpendicular to the longitudinal axis of the stand member, and a saddle member capable of being adjustably located at a desired site along the length of the stand member, the saddle member including a saddle formation adapted to receive a wheel wrench, a passage extending through the saddle member at an angle such that the saddle member can be relocated along the stand member by disengagement from the stand member by suitably angling the free end of the saddle member away from the ground engaging end of the stand and displacing the saddle member to a desired site along the stand member whilst the saddle member is in an angled condition, and a biassing means adapted to urge an engaging formation associated with the passage to engage a recess between a selected pair of the step-like formations.

DETAILED DESCRIPTION OF THE INVENTION

The invention will now be described by way of example, with reference to the accompanying drawings, in which.

Figure 1:
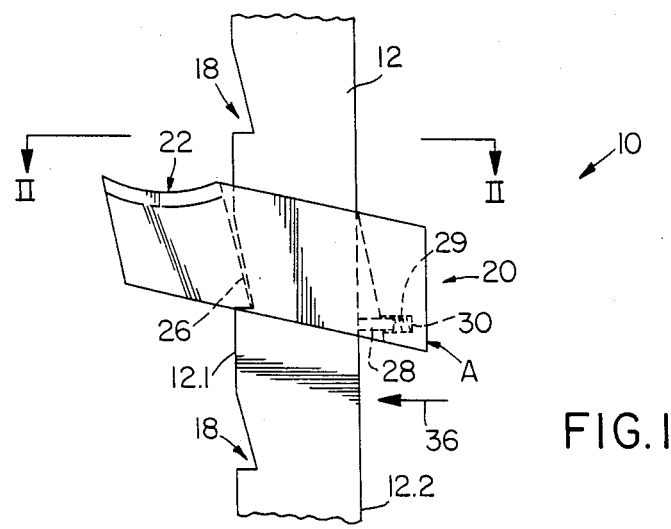
FIG. 1 shows a side view of a portion of a wheel wrench support according to the invention.

Although the word wheel nut or nut is used in this specification, it will be understood by any person skilled in the art that these expressions include a bolt or stud which is used for securing a road vehicle wheel to the vehicle wheel drum.

In the drawings, like reference numerals refer generally to like parts, unless otherwise indicated.

In the drawings, reference numeral 10 generally indicates a wheel wrench support. The support 10 shown in FIG. 4 has been cast of spheroidal graphitic iron, for ease of manufacture.

Figure 4:
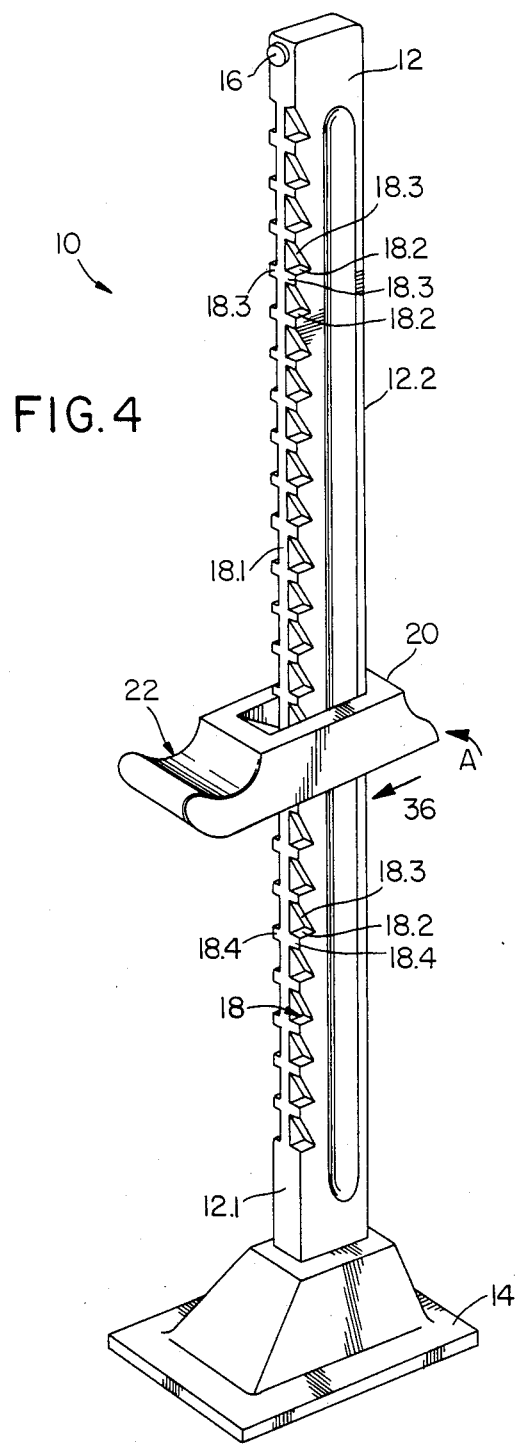
FIG. 4 shows a 3-dimensional view from the side of another wheel wrench support according to the invention.

The support 10 includes a stand member in the form of an elongate stand 12, the one end of which is provided with a base 14. In FIG. 4, the stand 12 and base 14 are cast integrally.

The stand 12, near its opposite end, is provided with a stop 16, for example a rivet, or the like.

The stand 12 is rectangular in plan view, and its one side 12.1 has a plurality of step-like formations in the form of notches 18 along the length of the stand as indicated. In FIG. 4, a central rib 18.1 has been provided to facilitate casting of the stand 12, but it will be seen that notches are provided on either side of the central rib 18.1.

As seen in FIG. 4, the notches 18 are each defined by a lower surface 18.2 which extends generally perpendicular to the longitudinal axis of the stand 12 and a surface 18.3 which extends obliquely upwardly from the inner end of its adjacent lower surface 18.2 to an intersection with the front face of stand 12. This defines a vertical surface 18.4 which extends laterally on either side of the rib 18.1 and between the surface 18.3 and the surface 18.1 of the next succeeding notch 18.

The support 10 also includes a saddle member in the form of a saddle 20, attached to the stand 12 and extending transversely from the stand 12. The saddle 20 has a arcuate shaped saddle formation or seat 22 in which, in use, part 24.1 of a wheel wrench 24 nestles.

The saddle 20 also has a step engaging formation 26 provided within a recess formation in the form of a passage 25 provided through the saddle 20, the formation 26 being shaped so that it can engage with the notches 18. The formation 26 cannot be seen in the support 10 shown in FIG. 4, but it is functionally similar except that it is divided in two parts which are separated from each other by a groove to allow for the central rib 18.1 of the stand 12.

Figure 2:
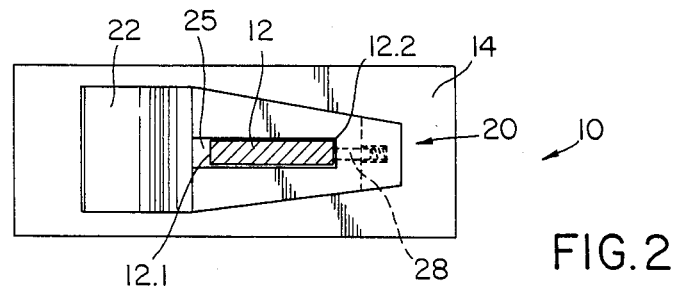
FIG. 2 shows a view through II—II of the wheel wrench support shown in FIG. 1.
Figure 3:
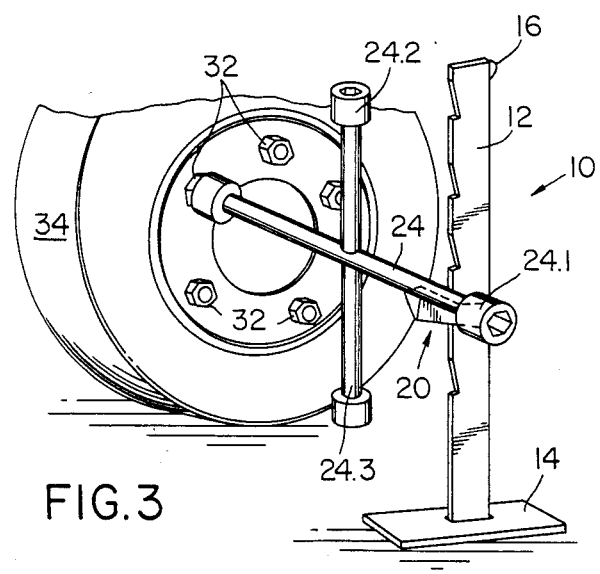
FIG. 3 shows a 3-dimensional view from the side of the wheel wrench support shown in FIG. 1, use.

The saddle 20 has a passage or aperture 25 through which the stand 12 passes, so that the saddle 20 is slideable along the length of the stand 12. The formation 26 is located on one side of the aperture 25, i.e. on that side of the aperture 25 which faces the notches 18. The saddle 20 also includes a spring-loaded pin 28 which is located on the opposite side of the aperture to the formation 26. In the case of the support 10 shown in FIG. 4, a spring-loaded ball (not shown) is provided in similar fashion to the spring-loaded pin 28 of the support 10 shown in FIGS. 1, 2, and 3. In practise the pin 28 is provided at a lower level than the formation 26. One end of the pin 28 is located in hole 29 provided in the saddle 20, and bears against a spring 30. The spring 30 urges the free end of the pin 28 against the side 12.2 of the stand 12, thereby causing the formation 26 to be urged into one of the notches 28.

In use, the wheel wrench 24 is engaged with a wheel nut 32 of a road vehicle wheel 34. The free end 24.1 of the wheel wrench is supported in the seat 22 of the saddle 20 along a line which is substantially co-axial with the axis of the nut 32. The base 14 rests on the ground, and for this purpose, friction-increasing means may be provided thereunder, for example in the form of studs or bumps. The stand 12 extends upwardly from the ground and generally in a position perpendicular to the ground.

In order to adjust the height of the saddle 20 to a desired position along the length of the stand 12 in order to bring the saddle 20 into co-axial alignment with the axis of the nut 32, part A of the saddle 20 is urged in the direction indicated by the arrow 36, against the bias of the spring 30. It will be noticed in particular that the passage 25 provided through the saddle 20, is provided angularly, resulting in the free end of the saddle 20 moving or tilting upwardly. Refer to FIG. 1. This results in the pin 28 (or the ball(not shown) in the case of FIG. 4) sliding into the recess 29 thereby compressing the spring 30. The formation 26 is thus freed from the notch 18, and the saddle 20 can then be slid along i.e. either upwardly or downwardly along the length of the stand 12 thereby to adjust the height of the saddle 20 above ground level.

When the saddle 20 is at a desired height, the pressure at point A is removed in order to engage the formation 26 with an appropriate notch i.e. between a selected pair of step-like formations. The spring 30 urges the pin 28 (or the ball, as mentioned above) against the side 12.2 of the stand 12, thereby engaging the formation 26 with an appropriate notch 18.

The limbs 24.2 and 24.3 of the wrench 24 can then be grasped by a user and rotated, thereby to fasten or loosen the nut 32.

The inventor has found that when a wrench 24 is used to loosen or fasten a nut 32 without the use of the support 10, the socket portion of the wrench 24 easily slips off the nut 32, especially when the nut 32 is very tight and requires considerable torque to loosen it. In such circumstances, the loosening operation becomes time-consuming, and damage can also be caused to the nut 32 by the wrench 24 when it slips off. These problems can be overcome by supporting the free end 24.1 of the wrench 24 on the saddle 20 of the support 10.

The inventor has found that a support 10 having a stand 12, with the following approximate dimensions will give good results:

Length—850 mm (total)
Width—30 mm
Thickness—20 mm

The inventor contends that a further advantage of the support 10 is its portability. It can easily form part of a toolkit of a road vehicle, especially a truck. Consequently, the invention extends also to a tool kit of a road vehicle which includes a wheel wrench support as hereinbefore described.

It is to be understood that the wrench 24 can, in another version, be in the form of a box or socket spanner. One end of the spanner is then fitted over the wheel nut 32 whilst the other end is supported by the saddle 20 of the support 10. A tommy bar (not shown) for turning the box or socket spanner, can then be inserted through one of the apertures at its opposite end. If necessary, the tommy bar can be fitted with an extension, for example a pipe for additional leverage.

A particular advantage of the support 10 is that it does not have any locating pins, or any other mechanism which need be manupulated in order to secure the saddle at a desired site along the length of the stand 12, and consequently therefore relocating the saddle 20 along the length of the stand 12 can be done simply by tilting the saddle 20, and moving it along the stand 12. Because of the location of the biassing means i.e. the pin 28 (or the ball, as the case may be) the saddle 20 tends to return to its perpendicular condition relative to the stand 12 automatically.

The support 10 can be readily made by casting from a suitable metal or alloy, as indicated above, thereby providing for low manufacturing costs, whilst at the same time producing an article which is readily and simply used.

It will be appreciated by any person skilled in the art, that although certain embodiments only of the invention have been described herein, several modifications and/or variations to the support 10 are possible. Such modifications and/or variations are to be considered as falling within the spirit and scope of the claims hereto.

I claim:

1. A wheel wrench support comprising:
    a stand having a ground engaging portion at one end and an elongate portion extending in upwardly from said ground engaging portion to define an axial direction,
    said elongate portion having a plurality of step-like formations formed along its length,
    a saddle member mounted on said elongate portion and including a saddle portion adapted to receive a wheel wrench,
    a passage in said saddle member of a size to permit said elongate portion to extend therethrough,
    said saddle member having a step-engaging portion formed therein and adjacent said passage,
    said saddle member being tiltable on said stand member between first and second angled orientations relative to said axial direction,
    said step-engaging portion being engageable on one of the plurality of step-like formations when the saddle member is in its first orientation to support said saddle member against movement downwardly toward said ground engaging portion,
    said step-engaging portion being moved out of engagement with said step-like formations when said saddle member is tilted upwardly to its second orientation to permit said saddle member to move in said axial direction, and
    said passage entending at an acute angle to said axial direction when in its first orientation and is parallel to said axial direction when in its second orientation,
    and biasing means urging said saddle member into its first orientation,
    the force exerted by a wrench on the saddle portion during use of said wrench acting to urge said saddle member into its first orientation,
    said biasing means including a spring disposed in an opening in said saddle member on the side of said passage opposite said step engaging portion and a ball disposed between said spring and said elongate portion.

2. The wheel wrench support set forth in claim 1 wherein said elongate portion has a surface extending in the axial direction, the passage in said saddle member being formed with at least one surface extending at an acute angle relative to the axial direction when the saddle is in its first orientation and which surface is generally parallel to the axial direction when said saddle member is in its second orientation so that said saddle member will be moveable longitudinally relative to said elongate member.

3. The wheel wrench support set forth in claim 1 wherein said elongate portion has a surface extending in the axial direction, said step-like formations being formed in said surface.

4. The wheel wrench support set forth in claim 1 wherein said step-like formations comprise a series of generally triangular notches formed in said elongate portion, said step-engaging portions comprising a first surface formed on said saddle member and defining a portion of said passage, said surface extending at an angle to the axial direction when said saddle member is in its first orientation and generally parallel to said axial direction when said saddle member is in its second orientation.

5. The wheel wrench support set forth in claim 1 wherein said saddle formation is disposed laterally of said passage, the force of a wheel wrench on said saddle during use of said wrench acting to urge said saddle to its first orientation and said step-engaging portion into engagement with one of said step-like formations.

6. The wheel wrench support set forth in claim 1 wherein said saddle portion is disposed laterally of said passage and is moveable upwardly when said saddle is moved from its first orientation to its second orientation whereby the force of a wheel wrench on said saddle will move said saddle formation downwardly thereby urging said step-engaging formation into engagement with one of said step-like formations.

7. The wheel wrench support set forth in claim 5 or 6 wherein said elongate portion has a surface extending in the axial direction, the passage in said saddle member being formed with at least one surface extending at an acute angle relative to the axial direction when the saddle is in its first orientation and which surface is generally parallel to the axial direction when said saddle member is in its second orientation so that said saddle member will be moveable longitudinally relative to said elongate member.

8. The wheel wrench support set forth in claim 7 wherein said elongate portion has a surface extending in the axial direction, said step-like formations being formed in said surface, and biasing means urging said saddle member for movement of said step-engaging portion toward said side surface.

9. The wheel wrench support set forth in claim 8 wherein said step-like formations comprise a series of generally triangular notches formed in said elongate portion, said step-engaging portions comprising a first surface formed on said saddle member and defining a portion of said passage, said surface extending at an angle to the axial direction when said saddle member is in its first orientation and generally parallel to said axial direction when said saddle member is in its second orientation.

10. The wheel wrench support set forth in claim 9 wherein said passage extends at an angle to said axial direction when in its first orientation and is parallel to said axial direction when in its second orientation.

11. The wheel wrench support set forth in claim 10 wherein said biasing means includes a spring.

12. A wheel wrench support comprising:
a stand having a ground engaging portion at one end and an elongate portion extending upwardly from said ground engaging portion to define an axial direction,
said elongate portion having a surface extending in the axial direction, a step-like formation comprising a series of generally triangular notches formed along the length of said surface,
a saddle member mounted on said elongate portion and including a saddle portion adapted to receive a wheel wrench,
a passage in said saddle member of a size to permit said elongate portion to extend therethrough,
said saddle member being tiltable on said stand member between first and second angled orientations relative to said axial direction,
said saddle member having a step-engaging portion formed therein and adjacent said passage, said step-engaging portions comprising a first surface formed on said saddle member and defining a portion of said passage, said first surface extending at an angle to the axial direction when said saddle member is in its first orientation and generally parallel to said axial direction when said saddle member is in its second orientation,
said saddle formation being disposed laterally of said passage, the force of a wheel wrench on said saddle formation during use of said wrench acting to urge said saddle to its first orientation and said step-engaging portion into engagement with one of said step-like formations,
the passage in said saddle member being formed with at least one surface extending at an acute angle relative to the axial direction when the saddle is in its first orientation and which surface is generally parallel to the axial direction when said saddle member is in its second orientation so that said saddle member will be moveable longitudinally relative to said elongate member,
a spring disposed in an opening in said saddle member on the side of said passage opposite said step-engaging portion for urging said saddle member into its first orientation and said step-engaging means toward the step like formations.

* * * * *